United States Patent [19]
Rockland et al.

[11] 3,869,556

[45] Mar. 4, 1975

[54] PROCESS FOR PREPARING QUICK-COOKING GARBANZO AND RED KIDNEY BEANS

[75] Inventors: Louis B. Rockland, Moraga; Eufrocina M. Zaragosa; Dulcie M. Hahn, both of Albany, all of Calif.

[73] Assignee: The United States of America as represented by the Secretary of Agriculture, Washington, D.C.

[22] Filed: Sept. 27, 1973

[21] Appl. No.: 401,324

[52] U.S. Cl.................. 426/352, 426/377, 426/459
[51] Int. Cl................................................ A23l 1/20
[58] Field of Search .......... 426/352, 342, 205, 507, 426/508, 271, 377, 459

[56] References Cited
UNITED STATES PATENTS
3,352,687  11/1967  Rockland et al.................... 426/271
3,635,728  1/1972  Rockland...................... 426/352 X

*Primary Examiner*—Raymond N. Jones
*Assistant Examiner*—Esther L. Massung
*Attorney, Agent, or Firm*—M. Howard Silverstein; Max D. Hensley; William Takacs

[57] ABSTRACT

Process for treating garbanzo and red kidney beans to make them quick-cooking while retaining the color and integrity of the beans and the seed coats thereof. In accordance with the process, the beans are soaked in an aqueous hydrating medium containing sodium chloride, sodium bicarbonate, and sodium carbonate at atmospheric pressure and ambient temperature.

6 Claims, No Drawings

PROCESS FOR PREPARING QUICK-COOKING GARBANZO AND RED KIDNEY BEANS

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of processes for producing quick-cooking garbanzo and red kidney beans. Further objects of the invention will be evident from the following description wherein parts and percentages are by weight unless otherwise specified.

In U.S. Pat. Nos. 3,318,708; 3,352,687; and 3,635,728 (Rockland et al., hereinafter referred to as '708, '687, and '728, respectively) procedures are described for preparing quick-cooking bean products, such as soybeans, lima beans, peas, lentils, and the like. The process described in '708 and '687 generally involves hydrating the beans in an aqueous medium by application and release of a vacuum, said medium containing sodium chloride and a chelating agent and having a slightly alkaline pH. In '728 beans are blanched in boiling water for a short period prior to soaking in the above-mentioned medium at room temperature and ordinary pressure.

When the aforesaid procedures are applied to garbanzo and red kidney beans, however, certain undesirable side-effects are produced. For example, in the case of garbanzo beans essentially the entire seed coat separates from the cotyledon during cooking if the beans are processed by the above procedures. Likewise, in the case of red kidney beans, the seed coats tend to be shriveled rather than smooth and shiny. In addition, the color of the latter is an unacceptable dark brown rather than the natural red-purple color. These unappealing characteristics preclude the use of such products in many food preparations, such as bean salads and bean marinates, where appearance is important to the general appeal of the product.

The invention described herein provides procedures that obviate the problems outlined above. Thus, not only are the products of the invention quick-cooking, but they also retain a desirable color, appearance, flavor, and texture. To prepare them for the table, they are added to boiling water and after simmering for a period of about 12 to 18 minutes are tender and ready for consumption. As mentioned above, the quick-cooking character is attained without significant damage to the individual beans. They retain their original structure with no cracking, splitting, or butterflying. In addition, the seed coats remain intact. As a consequence, they have a very attractive appearance and, moreover, when cooked, still retain the integral character of the individual beans. Thus, the products of the invention are eminently suited for the preparation of dishes wherein the structure of the individual beans needs to be maintained, such as bean salads and marinates. It is to be noted that, in garbanzo and red kidney beans, the skin is the portion most impervious to moisture and which offers the greatest resistance to softening during cooking. However, in the products of the invention, the skin as well as the cotyledons take up water readily and acquire a proper tenderness for eating with a very short cooking time. In addition to having the property of being quick-cooking and retaining their original structure, the products of the invention exhibit an excellent natural color and flavor, and may be kept for long periods of time without losing their quick-cooking character.

Another item is that when cooked the products of the invention retain higher levels of heat-labile nutrients than do conventional products which require retorting at high temperatures for extended periods of time.

A further advantage of the invention is that the loosening of the seed coat which occurs at an early stage in the process renders the beans non-viable, thereby preventing the normal biochemical changes and release of enzymes associated with the first stages of germination. As a result, the formation, liberation, and activation of lipoxidase and other enzymes are prevented, thereby minimizing the tendency of the products of the invention to sour or become rancid during storage. Another advantage of the invention is that the products produce less gastrointestinal distress and flatulence than do beans prepared in conventional manner.

In essence, the production of quick-cooking garbanzo and red kidney beans in accordance with the invention involves soaking the raw beans for about 24 hours at ambient temperature and atmospheric pressure in an aqueous hydrating medium consisting of water, sodium chloride, sodium bicarbonate, and sodium carbonate in particular proportions. The so-treated beans may be used immediately or preserved for future use as by dehydration, freezing, refrigerating, or the like.

A feature of the invention is that a special medium is used in the hydration step. Although this medium is largely water, it contains certain additives which provide advantageous results which could not be obtained with water alone. These useful effects of the additives are exerted during the hydration step and/or subsequent thereto. Thus since the additives are present in the medium which penetrates throughout the beans when they are hydrated, the additives may exert their desired activity at this stage. Moreover since the additives are imbibed and remain distributed throughout the bean tissue, they retain their influence during storage and subsequent cooking.

In the processes of '708, '687, and '728, mentioned above, an aqueous hydrating medium is used which contains a chelating agent as an essential ingredient. Our investigations have shown, however, that chelating agents are responsible for unfavorable effects on the texture, appearance, and color of garbanzo and red kidney bean seed coats. The hydration medium in accordance with the invention does not contain any chelating agent, and this factor contributes to the improved results obtained, in particular, preservation of the texture, appearance, and color of the seed coats of the treated beans.

In a practice of the invention as applied to garbanzo beans, the raw beans are soaked for about 24 hours, at ambient temperature and at atmospheric pressure, in the special hydrating medium. A primary consideration is that the agents of the medium be within a definite optimum concentration range. The primary agent in this hydration medium is sodium chloride within the concentration range of 1 to 3 percent, but preferably 2 percent. The sodium chloride aids in tenderizing the skin, peptizing the bean proteins and enhances the flavor of the cooked beans. In addition, there is present in the said medium, sodium bicarbonate in a concentration range of 0.25 to 0.75 percent, but preferably 0.375 percent, and sodium carbonate in a concentration range of 0.083 to 0.25 percent, but preferably 0.125 percent. These agents provide an initial pH of about 9 in the hydration medium. It is preferred that the hydrating medium be slightly alkaline for best results. The carbonate and bicarbonate, however, not only act as alkaline agents but also act as protein dissociating, solubilizing or tenderizing agents.

After the beans have been hydrated, they are separated from the hydrating medium and rinsed with water to remove excess medium from the surface of the beans. The washing should be kept to a minimum, however, to avoid removing more than just the agents adhering to the surface of the beans. Otherwise, the beans will lose their quick-cooking properties. In situations where appearance is not important, and a residue on the beans can be tolerated, this washing step may be eliminated.

Following washing, or directly after hydration, the beans are either cooked and processed immediately or treated to put them in a condition whereby they may be shipped and stored without spoiling. For the latter purpose freezing is preferred as the most effective method of preservation. This is conveniently effected by placing the processed beans on trays or perforated stainless steel belt and exposing them to refrigerated air. Generally, the air temperature and conditions of treatment (e.g., rate of airflow) are selected so that the freezing takes place rapidly. Generally, an air temperature of less than 0° F. is used and circulation of the air is rapid enough to get freezing in a short time, i.e., 5 minutes or less. The frozen product is then packaged in conventional manner and kept in frozen storage until used. For especially rapid freezing, the beans may be immersed in a cold liquid medium instead of being exposed to cold air. Especially useful in this connection is the technique of plunging the beans into liquid nitrogen for about 10 to 20 seconds whereby they become frozen almost instantaneously and without rapid expansion and cracking. The frozen product is then packaged and held in frozen storage as described. If desired, the treated beans may be packaged first and then frozen in conventional equipment such as a plate freezer.

In another alternative procedure, the hydrated beans may be preserved for limited periods of time, as for example for several weeks, by holding at refrigerator temperatures. The addition of a microbiological antagonist such as the ethyl or methyl esters of p-hydroxy benzoic acid will further extend the shelf life of the refrigerated product. In still another alternative preservation process, the hydrated beans may be partially dehydrated, and held at refrigerator temperature without the addition of preservatives. For example, the hydrated beans are dehydrated to a moisture content of 30 to 40 percent, then packaged—in a transparent plastic bag, for instance—and held at normal refrigerator temperature (about 40° F.) until they are ready to be cooked in the usual way in boiling water.

The products of the invention can also be preserved by dehydrating them to a self-preserving extent so that they can be stored at ordinary (ambient) temperatures. Dehydration can be accomplished with any of the conventional dryers used with food products. For example, a tray dryer can be used where the beans spread on trays are exposed to a crossflow and/or throughflow of air at about 130°–170° F. Another example is the use of a column-type dryer wherein the beans cascade over a baffle arrangement while exposed to a current of hot air. If desired, the drying may be conducted in stages, that is, a portion of the moisture content is removed in one stage, the material allowed to stand to permit equilibration of moisture and further drying and equilibration are repeated as necessary. Such stepwise drying is generally preferable as avoiding internal strains and thus preventing any rupture of individual kernels. In any event, the drying is continued until the product contains about 10–15 percent moisture.

In the treatment of red kidney beans in accordance with the invention, it is necessary to apply an extra step as follows:

Prior to soaking in the aqueous medium the beans must be blanched by contacting them with boiling water for 1 to 2 minutes. Following this blanching step, the red kidney beans are soaked for about 24 hours at ambient temperature and atmospheric pressure in an aqueous hydration medium which contains water; 1 to 3 percent, but preferably 2 percent, sodium chloride; 0.25 to 0.75 percent, but preferably 0.45 percent, sodium bicarbonate; and 0.083 to 0.25 percent, but preferably 0.15 percent, sodium carbonate. Following this soaking step, the beans may be cooked directly or processed in any of the ways hereinabove described in connection with garbanzo beans.

The invention is further demonstrated by the following illustrative example:

A solution of 2.0% sodium chloride, 0.375% sodium bicarbonate, and 0.125% sodium carbonate in water was prepared. Garbanzo beans were placed in this solution and soaked for 24 hours at ambient temperature and atmospheric pressure. Excess solution was drained from the beans, which were rinsed with water and placed in boiling water wherein they were simmered for 16 minutes.

Red kidney beans were blanched in boiling water for 1 minute, cooled, and soaked at ambient temperature and atmospheric pressure in an aqueous solution containing 2.0% sodium chloride, 0.45% sodium bicarbonate, and 0.15% sodium carbonate. After 24 hours the beans were removed from the solution, rinsed with water, and cooked for 14 minutes.

The so-prepared garbanzo and red kidney beans were incorporated into a marinated multi-bean salad. A panel of trained judges evaluated the salad for taste and appearance and compared this salad to commercial ones. The salads were found to be essentially indistinguishable on the basis of color and integrity of the beans. The salad produced with beans of the invention had a slight advantage in texture, the beans being somewhat crisper than conventionally-produced beans.

Having thus described the invention, what is claimed is:

1. A process for treating garbanzo beans to make them quick-cooking while retaining the integrity of the beans and the seed coats thereof, which consists of soaking raw garbanzo beans for about 24 hours at ambient temperature and atmospheric pressure in an aqueous hydrating medium consisting solely of water, 2% sodium chloride, 0.375% sodium bicarbonate, and 0.125% sodium carbonate.

2. The process of claim 1 wherein the soaked beans are preserved by dehydration.

3. The process of claim 1 wherein the soaked beans are preserved by freezing or refrigeration.

4. A process for treating red kidney beans to make them quick-cooking while retaining the color and integrity of the beans and the seed coats thereof, which consists of
   a. blanching raw red kidney beans by contacting them with boiling water for 1 to 2 minutes, and
   b. soaking the beans for about 24 hours at ambient temperature and atmospheric pressure in an aqueous hydrating medium consisting solely of water, 2% sodium chloride, 0.45% sodium bicarbonate, and 0.15% sodium carbonate.

5. The process of claim 4 wherein the soaked beans are preserved by dehydration.

6. The process of claim 4 wherein the soaked beans are preserved by freezing or refrigeration.

* * * * *